US011006481B2

(12) United States Patent
Lee et al.

(10) Patent No.: US 11,006,481 B2
(45) Date of Patent: May 11, 2021

(54) D2D OPERATION METHOD OF TERMINAL IN WIRELESS COMMUNICATION SYSTEM AND TERMINAL USING METHOD

(71) Applicant: LG ELECTRONICS INC., Seoul (KR)

(72) Inventors: Seungmin Lee, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/610,483

(22) PCT Filed: May 2, 2018

(86) PCT No.: PCT/KR2018/005106
§ 371 (c)(1),
(2) Date: Nov. 1, 2019

(87) PCT Pub. No.: WO2018/203669
PCT Pub. Date: Nov. 8, 2018

(65) Prior Publication Data
US 2020/0163155 A1 May 21, 2020

Related U.S. Application Data

(60) Provisional application No. 62/492,941, filed on May 1, 2017.

(51) Int. Cl.
*H04W 88/04* (2009.01)
*H04B 7/06* (2006.01)
*H04L 1/00* (2006.01)
*H04L 5/00* (2006.01)
*H04W 28/02* (2009.01)
(Continued)

(52) U.S. Cl.
CPC .......... *H04W 88/04* (2013.01); *H04B 7/0632* (2013.01); *H04L 1/0026* (2013.01);
(Continued)

(58) Field of Classification Search
CPC ............. H04W 88/04; H04W 28/0215; H04W 72/042; H04W 72/1242; H04W 72/1289; H04B 7/0632; H04L 1/0026; H04L 5/0053
(Continued)

(56) References Cited

U.S. PATENT DOCUMENTS 10,873,933 B2 * 12/2020 Liu .................... H04W 72/0486
2006/0182026 A1 * 8/2006 Zhu ........................ H04L 1/1887
370/229
(Continued)

FOREIGN PATENT DOCUMENTS

WO 2016182601 11/2016

OTHER PUBLICATIONS

PCT International Application No. PCT/KR2018/005106, International Search Report dated Aug. 10, 2018, 4 pages.
(Continued)

*Primary Examiner* — Christopher R Crompton
(74) *Attorney, Agent, or Firm* — Lee Hong Degerman Kang Waimey

(57) ABSTRACT

The present invention provides a method by which a relay terminal determines priority in a wireless communication system including a base station, the relay terminal, and a remote terminal, the method comprising: acquiring remote terminal related information; acquiring the remote terminal related information, and then determining the priority between pieces of the remote terminal related information and the priority between the remote terminal related information and relay terminal related information; and trans-
(Continued)

mitting the information on the basis of the priority, wherein the relay terminal transmits, on the basis of the priority determined by the relay terminal, the information by applying different physical channel parameters.

3 Claims, 15 Drawing Sheets

(51) Int. Cl.
*H04W 72/04* (2009.01)
*H04W 72/12* (2009.01)

(52) U.S. Cl.
CPC ....... *H04L 5/0053* (2013.01); *H04W 28/0215* (2013.01); *H04W 72/042* (2013.01); *H04W 72/1242* (2013.01); *H04W 72/1289* (2013.01)

(58) Field of Classification Search
USPC .......................................................... 370/329
See application file for complete search history.

(56) References Cited

U.S. PATENT DOCUMENTS

| | | | |
|---|---|---|---|
| 2013/0178221 A1* | 7/2013 | Jung | H04W 52/281 455/450 |
| 2016/0315741 A1* | 10/2016 | Tsai | H04L 5/0007 |
| 2016/0381596 A1* | 12/2016 | Hu | H04B 7/022 370/236 |
| 2017/0099688 A1 | 4/2017 | Chae et al. | |
| 2017/0230939 A1* | 8/2017 | Rudolf | H04W 4/70 |
| 2018/0184431 A1* | 6/2018 | Li | H04W 52/243 |
| 2019/0245649 A1* | 8/2019 | Siomina | H04B 17/309 |
| 2019/0357226 A1* | 11/2019 | Lin | H04W 72/085 |
| 2020/0037359 A1* | 1/2020 | Wang | H04L 1/1896 |

OTHER PUBLICATIONS

Lenovo, "Discussion on Communication and UE-to-NW relaying aspects," 3GPP TSG-RAN WG1 #88bis, R1-1705657, Apr. 2017, 6 pages.

* cited by examiner

D2D OPERATION METHOD OF TERMINAL IN WIRELESS COMMUNICATION SYSTEM AND TERMINAL USING METHOD

CROSS-REFERENCE TO RELATED APPLICATIONS

This application is the National Stage filing under 35 U.S.C. 371 of International Application No. PCT/KR2018/005106, filed on May 2, 2018, which claims the benefit of U.S. Provisional Application No. 62/492,941, filed on May 1, 2017, the contents of which are all hereby incorporated by reference herein in their entirety.

BACKGROUND

Field

The present disclosure relates to wireless communication, and more particularly, to a device-to-device (D2D) operation method of a terminal in a wireless communication system and a terminal using the method.

Related Art

In the International Telecommunication Union Radio Communication Sector (ITU-R), standardization of International Mobile Telecommunication (IMT)-Advanced, a next generation mobile communication system after 3rd generation, is underway. IMT-Advanced aims to support IP (Internet Protocol) based multimedia service at data rates of 1 Gbps in a stationary and low-speed moving state and 100 Mbps in a high-speed moving state.

The 3rd Generation Partnership Project (3GPP) is a system standard that meets the requirements of IMT-Advanced, and LTE-Advanced (LTE-A), which has improved Long Term Evolution (LTE) based on Orthogonal Frequency Division Multiple Access (OFDMA)/Single Carrier-LTE-Advanced (LTE-A), is being prepared. LTE-A is one of the strong candidates for IMT-Advanced.

Recently, interest in D2D technologies that allow direct communication between devices has increased. In particular, D2D has come to prominence as a communication technologies for a public safety network. Commercial communication networks are rapidly changing to LTE, but current public safety networks are mainly based on 2G technologies in terms of cost and conflict with existing communication standards. The gap in technologies and the need for improved services have led to efforts to improve public safety networks.

The present disclosure aims to provide examples of a method in which a relay UE transmits information of a narrow-band remote UE (having at least predetermined high priority) with high reliability.

SUMMARY

The present disclosure provides a D2D operation method of a terminal in a wireless communication system and a terminal using the method.

In an aspect, a method for determining a priority performed by a relay user equipment (UE) in a wireless communication system including a base station (BS), a relay UE, and a remote UE is provided. The method may comprise obtaining the remote UE related information, determining a priority between the remote UE related information and a priority between the remote UE related information and the relay UE related information, after the remote UE related information is obtained and performing information transmission on the basis of the priority, wherein the relay UE performs the information transmission by applying different physical channel parameters on the basis of the priority determined by the relay UE.

The remote UE may be a UE having communication capability of a limited size band.

The relay UE may determine that the remote UE related information has a priority higher than a priority of wide area network (WAN) communication related data information of the relay UE if the remote UE related information is WAN communication related control information or feedback information, and the relay UE may transmit the WAN communication related control information or feedback information of the remote UE to the BS.

The relay UE may determine that sidelink communication related control information or feedback information for the remote UE in the remote UE related information has a priority higher than a priority of WAN communication related data information of the remote UE, and the relay UE may transmit the sidelink communication related control information or feedback information for the remote UE to the BS.

The relay UE may determine that WAN communication related control information or feedback information of the remote UE in the remote UE related information has a priority higher than a priority of sidelink communication related control information or feedback information for the remote UE, and the relay UE may transmit the WAN communication related control information or feedback information of the remote UE to the BS.

The WAN communication related control information or feedback information may comprise WAN downlink channel state information (CSI) of the remote UE, WAN downlink HARQ-ACK information, or WAN uplink scheduling request (SR) information, and the sidelink communication related control information or feedback information comprises decoding state information for a sidelink channel received from the remote UE, sidelink CSI information, or sidelink measurement information.

The relay UE may transmit the remote UE related information together with information of the relay UE through a redefined channel, and predefined control information or feedback information is piggybacked to the predefined channel and transmitted.

The relay UE may transmit the information by applying a different beta offset value according to the priority, and the beta offset is a parameter for adjusting the number of modulated symbols used for information transmission.

The relay UE may allocate a larger number of the modulated symbols to transmission of information having a high priority.

The relay UE may transmit the information by applying a different power parameter according to the priority, and the relay UE allocates more power to transmission of information having a high priority.

The relay UE may transmit the information by applying a different modulation and coding scheme (MCS) according to the priority, and the relay UE applies a relatively high MCS value to transmission of information having a low priority.

The relay UE may add a different cyclic redundancy checksum (CRC) to information related to each remote UE, and each CRC related parity bit is scrambled with a distinguishing ID of each remote UE.

In another aspect, a relay user equipment (UE) in a wireless communication system including a base station (BS), a relay UE, and a remote UE is provided. The relay UE may comprise a transceiver transmitting and receiving a wireless signal and as processor coupled to the transceiver to operate, wherein the processor obtains the remote UE related information, determines a priority between the remote UE related information and a priority between the remote UE related information and the relay UE related information after the remote UE related information is obtained, and performs information transmission on the basis of the priority, wherein the relay UE performs the information transmission by applying different physical channel parameters on the basis of the priority determined by the relay UE.

According to the present disclosure, a relay UE may transmit information of a narrow-band remote UE (having at least predetermined high priority) with high reliability.

DESCRIPTION OF EXEMPLARY
EMBODIMENTS

Figure 1:
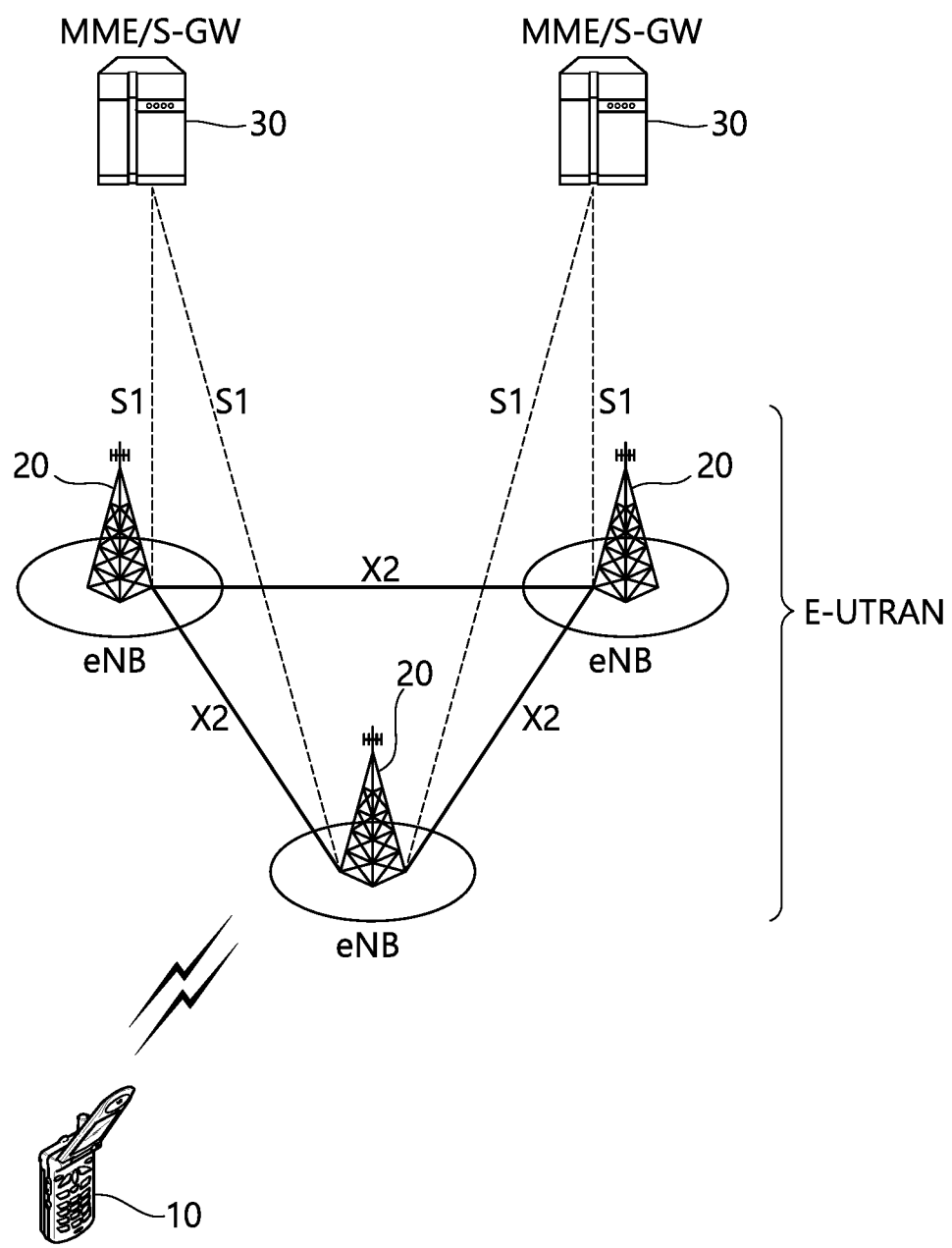
FIG. 1 illustrates a wireless communication system.

FIG. 1 illustrates a wireless communication system. The wireless communication system may also be referred to as an evolved-UMTS terrestrial radio access network (E-UTRAN), or long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
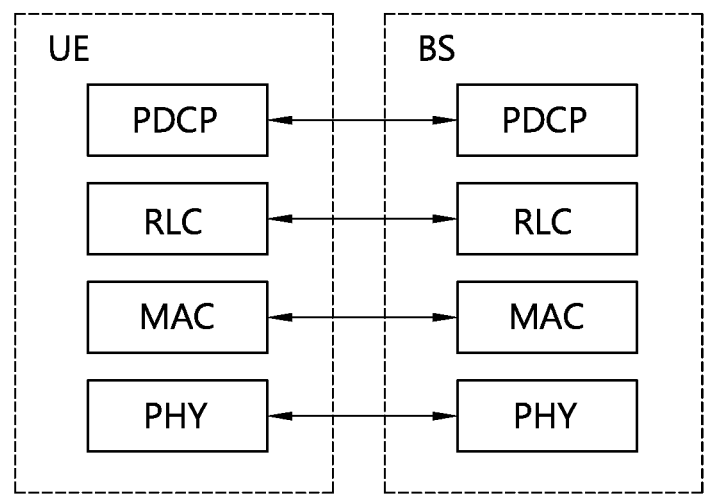
FIG. 2 is a diagram showing a wireless protocol architecture for a user plane.
Figure 3:
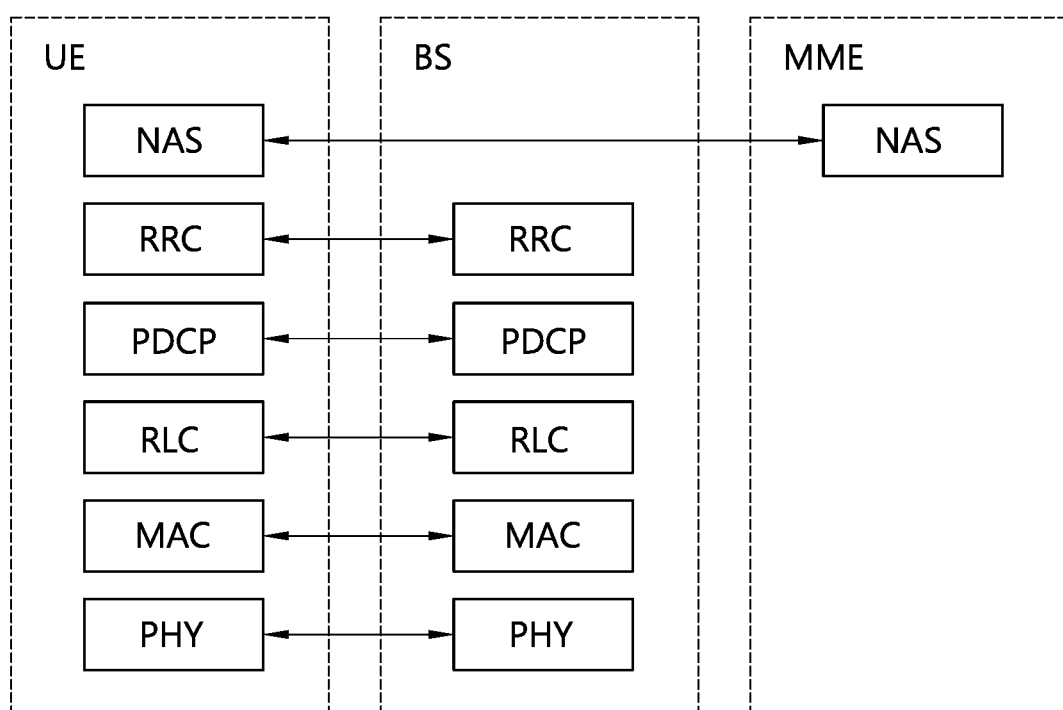
FIG. 3 is a diagram showing a wireless protocol architecture for a control plane.

FIG. 2 is a diagram showing a wireless protocol architecture for a user plane. FIG. 3 is a diagram showing a wireless protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a procedure of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

Hereinafter, a new radio access technology (new RAT) will be described. The new RAT may be abbreviated as new radio (NR).

As more communication devices demand larger communication capacities, there is a need for improved mobile broadband communication as compared to the existing radio access technologies (RAT). Massive machine type Communications (MTC), which connects multiple devices and objects to provide various services anytime and anywhere, is also one of the major issues to consider in next-generation communication. In addition, communication system design considering services/terminals that are sensitive to reliability and latency has been discussed. The introduction of next-generation wireless access technologies considering such enhanced mobile broadband communication, massive MTC, ultra-reliable and low latency communication (URLLC), and the like, has been discussed, and the corresponding technology is referred to as new RAT or NR for the convenience sake in the present disclosure.

Figure 4:
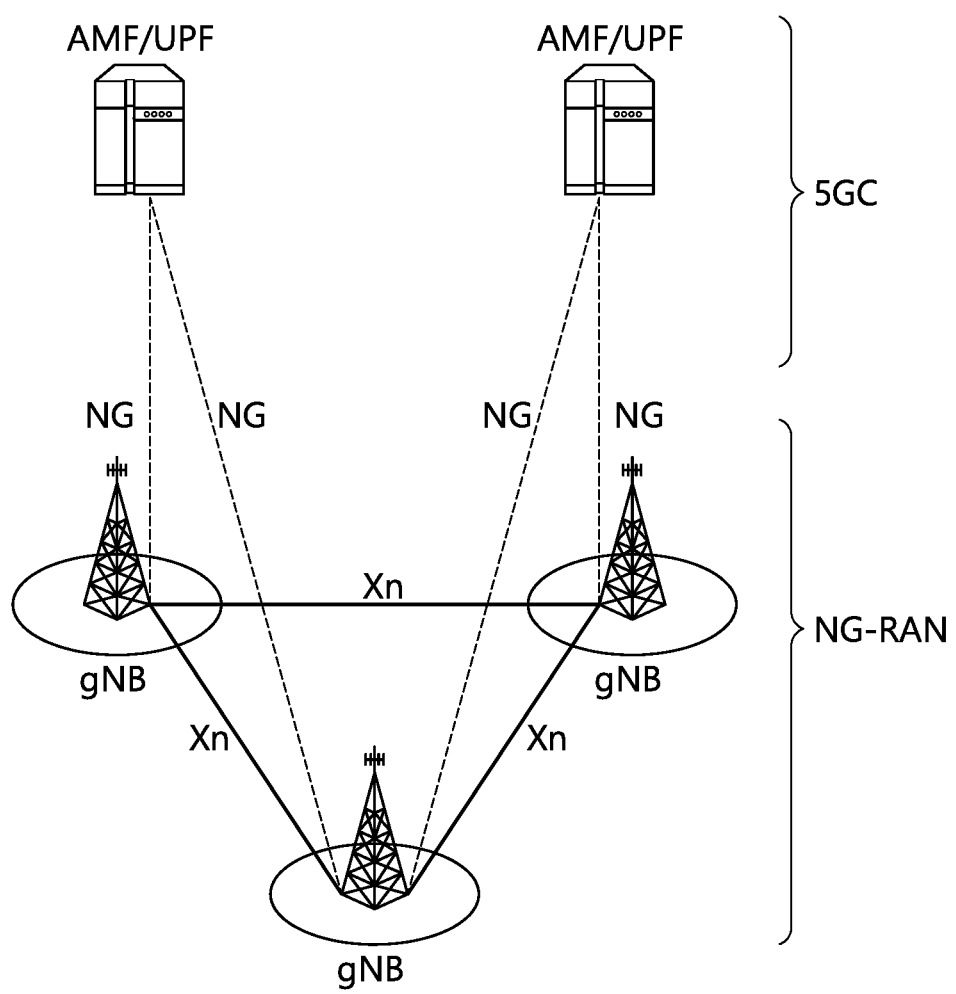
FIG. 4 illustrates a system structure of a new generation radio access network (NG-RAN) to which NR is applied.

FIG. 4 illustrates a system structure of a new generation radio access network (NG-RAN) to which NR is applied.

Referring to FIG. 4, the NG-RAN may include a gNB and/or an eNB providing a user plane and a control plane protocol termination to a terminal. FIG. 4 illustrates a case of including only the gNB. The gNB and eNB are connected to each other by an Xn interface. The gNB and eNB are connected to a 5G Core Network (5GC) through an NG interface. More specifically, the gNB and eNB are connected to the access and mobility management function (AMF) through an NG-C interface and connected to a user plane function (UPF) through an NG-U interface.

Figure 5:
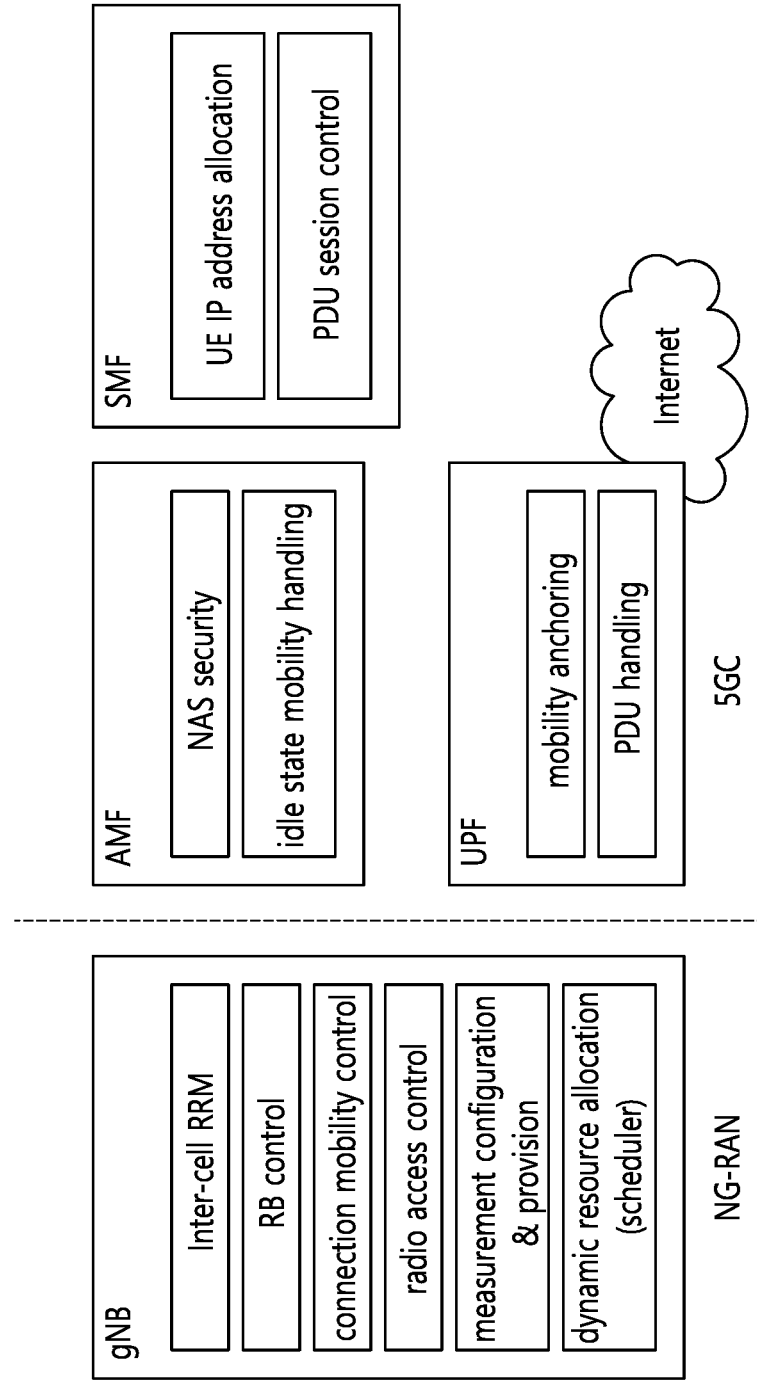
FIG. 5 illustrates functional partitioning between NG-RAN and 5GC.

FIG. 5 illustrates functional partitioning between NG-RAN and 5GC.

Referring to FIG. 5, the gNB may provide inter-cell radio resource management (RRM), radio bearer (RB) control, connection mobility control, radio access control, measurement configuration & provision, dynamic resource allocation, and the like. An AMF may provide functions such as NAS security, idle state mobility handling, and the like. A UPF may provide functions such as mobility anchoring, PDU handling, and the like. A session management function (SMF) may provide functions such as UE IP address allocation, PDU session control, and the like.

Figure 6:
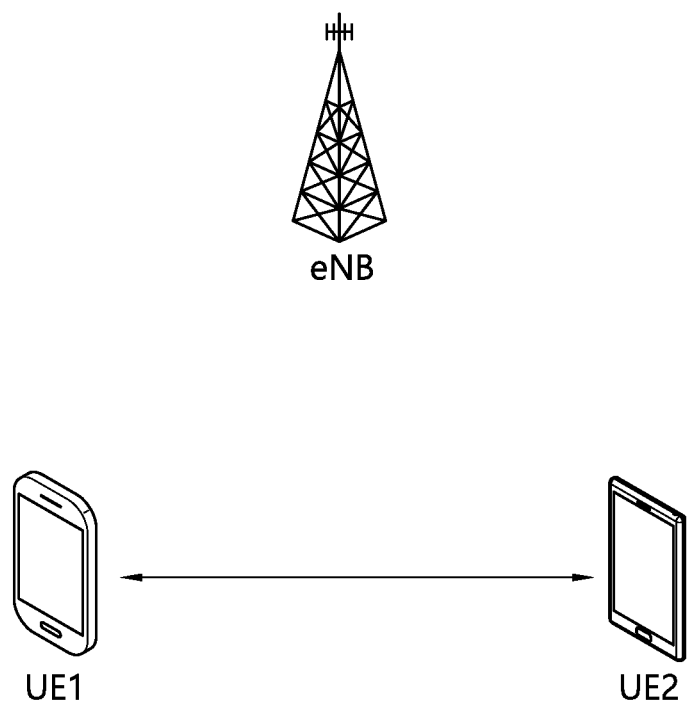
FIG. 6 illustrates UEs performing V2X or D2D communication.

FIG. 6 illustrates UEs performing V2X or D2D communication.

Referring to FIG. 6, in the V2X/D2D communication, the term "UE" mainly refers to a terminal of a user. However, when network equipment such as a BS (BS) (or eNB) transmits and receives signals according to a communication method between terminals, it may also be regarded as a kind of terminal.

UE 1 may operate to select a resource unit corresponding to a specific resource in a resource pool which means a set of resources and transmit a D2D signal using the corresponding resource unit. UE 2, as a receiving terminal, for which a resource pool to which the UE 1 may transmit a signal is configured, may detect a signal of the UE 1 within the resource pool.

Here, when the UE 1 is in a connection range of the BS, the BS may inform the UE1 about the resource pool. Meanwhile, when the UE 1 is outside the connection range of the BS, another terminal may inform the UE 1 about the resource pool or a predetermined resource may be determined.

In general, the resource pool includes a plurality of resource units, and each terminal may select one or a plurality of resource units to use for transmitting a D2D signal thereof.

Figure 7:
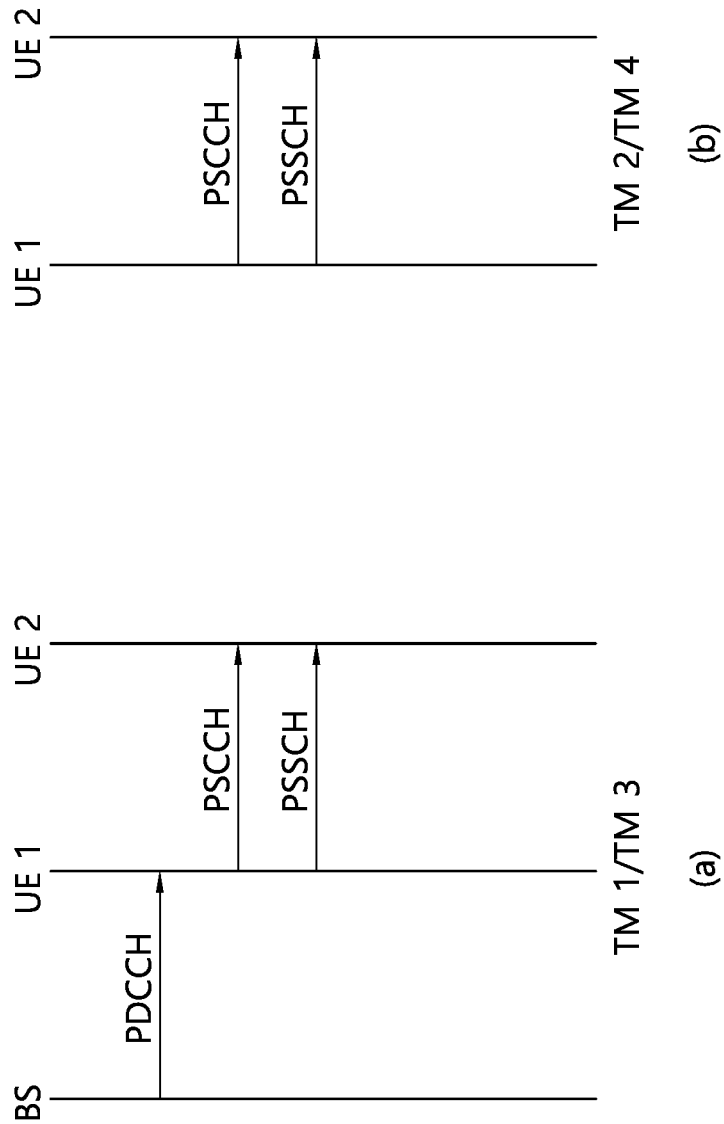
FIG. 7 illustrates UE operation according to a transmission mode (TM) related to V2X/D2D.

FIG. 7 illustrates UE operation according to a transmission mode (TM) related to V2X/D2D.

FIG. 7(a) shows transmission modes 1 and 3, and FIG. 7(b) shows transmission modes 2 and 4. In the transmission modes 1 and 3, the BS performs resource scheduling on the UE 1 through a PDCCH (specifically, DCI), and the UE 1 performs D2D/V2X communication with the UE 2 according to the resource scheduling. The UE 1 may transmit sidelink control information (SCI) to UE 2 through a physical sidelink control channel (PSCCH) and then transmit data based on the SCI through a physical sidelink shared channel (PSSCH). Transmission mode 1 may be applied to D2D and transmission mode 3 may be applied to V2X.

The transmission modes 2 and 4 may be referred to as modes in which a terminal performs scheduling itself. More specifically, the transmission mode 2 is applied to the D2D, and the terminal may select a resource itself in the configured resource pool and perform the D2D operation. The transmission mode 4 is applied to the V2X, in which the UE may select a resource itself in a selection window through sensing/SA decoding process or the like and subsequently perform a V2X operation. After transmitting the SCI through the PSCCH to the UE 2, the UE 1 may transmit the SCE-based data through the PSSCH. Hereinafter, the transmission mode may be simply referred to as mode.

Control information transmitted by the BS to the terminal through the PDCCH is called downlink control information (DCI), whereas control information transmitted by the terminal to another terminal through the PSCCH may be referred to as SCI. The SCI may transfer sidelink scheduling information. The SCI may have various formats, for example, SCI format 0 and SCI format 1.

The SCI format 0 may be used for scheduling the PSSCH. The SCI format 0 may include a frequency hopping flag (1 bit), a resource block allocation and hopping resource allocation field (the number of bits may vary depending on the number of resource blocks of a sidelink), a time resource pattern (7 bits), a modulation and coding scheme (MCS) (5 bits), a time advance indication (11 bits), a group destination ID (8 bits), and the like.

The SCI format 1 may be used for scheduling the PSSCH. The SCI format 1 may include priority (3 bits), resource reservation (4 bits), frequency resource position of initial transmission and retransmission (the number of bits may vary depending on the number of subchannels of a sidelink), a time gap between initial transmission and retransmission (4 bits), an MCS (5 bits), a retransmission index (1 bit), a reserved information bit, and the like. The reserved information bit may be simply referred to as a reserved bit hereinafter. The reserved bit may be added until a bit size of the SCI format 1 reaches 32 bits. That is, the SCI format 1 includes a plurality of fields including different information, and bits of the remaining number of bits except a total number of bits of the plurality of fields from the fixed total number of bits (32 bits) of the SCI format 1 may be referred to as reserved bits.

The SCI format 0 may be used in the transmission modes 1 and 2, and the SCI format 1 may be used in the transmission modes 3 and 4.

Figure 8:
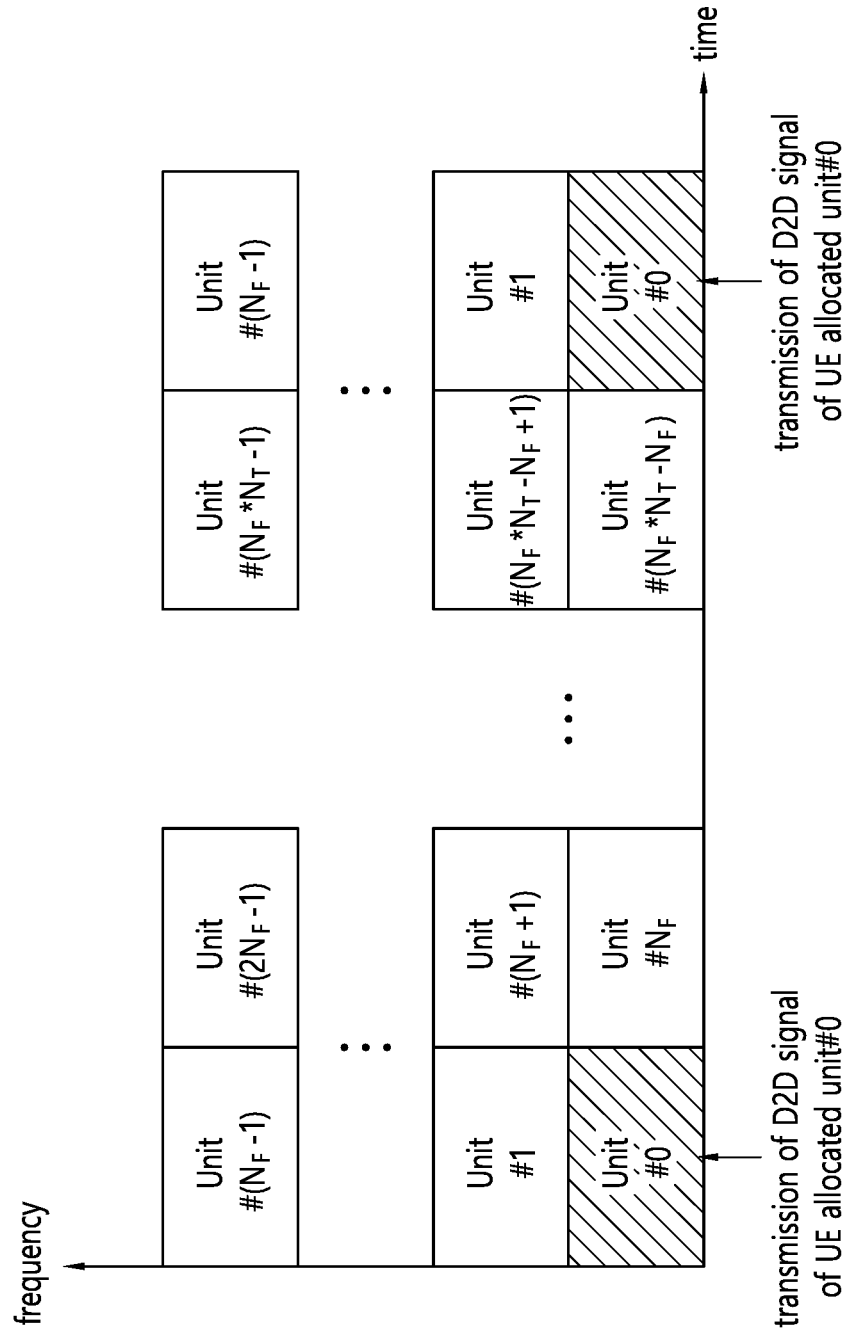
FIG. 8 shows a configuration example of a resource unit.

FIG. 8 shows a configuration example of a resource unit.

Referring to FIG. 8, the entire frequency resources of the resource pool may be divided into $N_F$, and the entire time resources of the resource pool may be divided into $N_T$, so that a total of $N_F*N_T$ resource units may be defined in the resource pool.

Here, a case where the resource pool is repeated on a cycle of an $N_T$ subframe.

One resource unit (e.g., Unit #0) may be periodically displayed repeatedly as shown in FIG. 8. Alternatively, in order to obtain a diversity effect in the time or frequency dimension, an index of a physical resource unit to which one logical resource unit is mapped may change in a predetermined pattern according to time. In such a resource unit structure, a resource pool may refer to a set of resource units that may be used for transmission by a terminal that wants to transmit a D2D signal.

Resource pools may be divided into several types. For example, the resource pools may be classified according to the contents of the D2D signal transmitted from each resource pool. Each resource pool may be classified as follows and the contents of a next D2D signal may be transmitted in each resource pool.

1) Scheduling assignment (SA) resource pool or D2D (sidelink) control channel: A resource pool for each transmitting terminal transmits a signal including information required for demodulating a resource position of a D2D data channel transmitted in a subsequent or the same subframe and other data channels (example: MCS or MIMO transmission method, timing advance, etc.).

The signal described in 1) may be multiplexed together with D2D data on the same resource unit and transmitted. In this case, the SA resource pool may refer to a resource pool in which an SA is multiplexed with D2D data and transmitted. The SA resource pool may also be called a D2D (sidelink) control channel.

2) D2D data channel: A resource pool used for a transmitting terminal to transmit user data using a designated resource through SA. If the D2D data and the SA information are multiplexed and transmitted together on the same resource unit, only the D2D data channel except for the SA information may be transmitted in the resource pool for the D2D data channel. In other words, a resource element used to transmit SA information on individual resource units in the SA resource pool is still used to transmit D2D data in the D2D data channel resource pool.

3) Discovery channel: A resource pool for a message that allows a transmitting terminal to transmit information, such as an ID (identity) thereof, so that a neighboring terminal may discover the transmitting terminal.

Even when the contents of the D2D signal described above are the same, different resource pools may be used according to the transmission/reception attributes of the D2D signal. For example, even the same D2D data channel or discovery message may be classified into different resource pools according to a transmission timing determining method of a D2D signal (e.g., whether it is transmitted at a reception time of a synchronization reference signal or whether it is transmitted by applying a certain timing advance at the reception time), a resource allocation method (e.g., whether the BS designates transmission resources of individual signals to individual transmission terminals or whether the individual transmission terminals select signal transmission resources thereof in the resource pool), a signal format (e.g., the number of symbols occupied by each D2D signal in one subframe or the number of subframes used to transmit one D2D signal), a signal strength from the BS, a transmission power strength of the D2D UE, and the like.

As described above, the method of directly indicating transmission resources of the D2D transmitting terminal by the BS in D2D communication may be called Mode 1 and the method in which the transmission resource region is set in advance or the BS designates the transmission resource region and the terminal directly selects a transmission resource may be called Mode 2.

In the case of D2D discovery, a case where the BS directly indicates a resource may be called Type 2 and a case where the terminal directly selects a transmission resource in a preset resource area or a resource area indicated by the BS may be called Type 1.

Meanwhile, the D2D may be referred to as sidelink. The SA may be referred to as a physical sidelink control channel (PSCCH), and the D2D synchronization signal may be referred to as a sidelink synchronization signal (SLSS or SSS). Prior to D2D communication, a control channel that transmits the most basic information may be called a physical sidelink broadcast channel (PSBCH) and the PSBCH may be transmitted together with an SSS or may be referred to as a physical D2D synchronization channel (PD2DSCH). A signal for a specific terminal to notify that the specific terminal is present nearby may include an ID of the specific terminal, and a channel through which the signal is transmitted may be called a physical sidelink discovery channel (PSCHCH).

In D2D, only the D2D communication terminal transmits the PSBCH together with the SSS and, due to this, measurement of the SSS is performed by using a demodulation reference signal (DMRS) of the PSBCH. An out-coverage terminal may determine whether itself may become a synchronization source by measuring a DMRS of the PSBCH and measuring a reference signal received power (RSRP) or the like of the signal.

Hereinafter, a sidelink received signal strength Indicator (S-RSSI), a PSSCH reference signal received power (PSSCH-RSRP), a channel busy (CBR), a channel occupancy ratio (CR) will be described.

<S-RSSI>

The S-RSSI may be defined as a linear average of the total received power (in [W]) per SC-FDMA symbol observed by the UE only in the configured sub-channel in SC-FDMA symbols 1, 2, . . . , 6 of a first slot and SC-FDMA symbols 0, 1, . . . , 5 of a second slot of a subframe.

Here, a reference point of the S-RSSI may be an antenna connector of a terminal.

If receiver diversity is used by the terminal, a reported value may not be lower than the corresponding S-RSSI of a certain individual diversity branch.

S-RSSI may be applied at an RRC_IDLE intra frequency, an RRC_IDLE inter frequency, an RRC_CONNECTED intra frequency, and/or an RRC_CONNECTED inter frequency.

<PSSCH-RSRP>

The PSSCH-RSRP may be defined as the linear average over the power contributions (in [W]) of the resource elements that carry demodulation reference signals associated with PSSCH, within the PRBs indicated by the associated PSCCH).

Here, a reference point for the PSSCH-RSRP may be an antenna connector of the terminal.

If receiver diversity is used by the terminal, a reported value may not be lower than the corresponding PSSCH-RSRP of a certain individual diversity branch.

The PSSCH-RSRP may be applied at the RRC_IDLE intra frequency, the RRC_IDLE inter frequency, the RRC_CONNECTED intra frequency, and/or the RRC_CONNECTED inter frequency.

Here, power per resource element may be determined from energy received in useful portion of the symbol, except for the CP.

<CBR>

The CBR measured in subframe n may be defined as follows.

The CBR may refer to a portion of a subchannel in a resource pool in which a S-RSSI measured by the terminal during a subframe [n−100, n−1] exceeds a preset threshold, with respect to a PSSCH.

The CBR may refer to a portion of a subchannel in a resource pool in which a S-RSSI measured by the terminal during a subframe [n−100, n−1] exceeds a preset threshold, in a pool in which the PSCCH is transmitted in adjacent resource blocks which are not adjacent together with the PSSCH corresponding to the PSCCH, with respect to the PSSCH. Here, it may be assumed that the PSCCH pool includes resources having a size of two consecutive physical resource block (PRB) pairs in a frequency domain.

The CBR may be applied at the RRC_IDLE intra frequency, the RRC_IDLE inter frequency, the RRC_CONNECTED intra frequency, and/or the RRC_CONNECTED inter frequency.

Here, the subframe index may be based on a physical subframe index.

<CR>

The CR evaluated in the subframe n may be defined as follows.

It may refer to dividing the number of subchannels used for transmission of the UE, which are granted in subframe [n−a, n−1] and in subframe [n, n+b], by the number of subchannels set in a transmission pool during [n−a, n+b].

The CR may be applied at the RRC_IDLE intra frequency, the RRC_IDLE inter frequency, the RRC_CONNECTED intra frequency, and/or the RRC_CONNECTED inter frequency.

Here, a may be a positive integer and b may refer to 0 or a positive integer. A and b may be determined by the terminal, and here, 'a+b+1=1000', 'a>=500' and n+b should not exceed the last transmission opportunity of the grant for the current transmission.

Here, the CR may be evaluated for each (re)transmission.

Here, when evaluating CR, the terminal may assume that a transmission parameter used in subframe n may be reused according to an existing permission in subframe [n+1, n+b]without packet drop.

Here, the subframe index may be based on the physical subframe index.

Here, the CR may be calculated for each priority level.

<Further Enhancement Device-to-Device (FeD2D)>

Hereinafter, FeD2D will be described.

A standard RAN operation for activating proximity services started, laying stress on public safety applications, in LTE Rel.12. Major functions standardized in LTE Rel. 12 will be described hereinafter.

Device to device discovery within network coverage (both commercial and public safety use cases)

In device-to-device broadcast communication, the higher layers support groupcast and unicast communication for inside/partial network coverage mainly targeting public safety use cases and outside network coverage.

There is much interest in connecting and managing a low cost MTC device using LTE technologies. One important example of such a low cost device is a wearable device, which has the advantage of being close to a smartphone that may almost always act as a relay. Thus, research on a method of applying D2D to such devices, including non-3GPP short-range technology, has been conducted, and in particular there are two main aspects to be further enhanced in LTE technology to enable D2D aided wearable and MTC applications.

Enhancement of UE-to-Network relaying functionality: In a relay structure between a UE and a network in ProSe, an access layer does not distinguish between traffic of a relay UE (or relay UE) and traffic of a remote UE (or remote UE). This model limits the network and operator's ability to treat the remote UE as a separate device by a separate service for billing or security, and the like. In particular, the 3GPP security association never reaches end-to-end between the network and the remote UE, which means that the relay UE has clear text access to communication of the remote UE. UE-network relaying should be strengthened to support a relay link, service continuity, E2E QoS if possible, efficient operation with multiple remote UEs, and end-to-end security through efficient route switching between Uu and D2D air interfaces. relaying using D2D may be based on non-3GPP technologies such as Bluetooth and Wi-Fi. Some enhanced functions such as service continuity may make the relaying of such technologies more attractive in commercial use cases. This may be particularly useful for wearable devices due to a limitation (e.g., a limitation in a size of a battery) of a form-factor making usage patterns close to the user's smartphone and direct Uu connections impractical. relaying may enable significant power savings for remote UEs (obtaining relayed traffic). This is especially true in deep coverage scenarios. One cost-effective way to introduce relaying is to use a uni-directional D2D link between remote devices and relay devices. In this case, a relay UE may be used to relay only uplink data from the remote UE. The advantage of this approach is that there is no additional RF functionality to add D2D reception to the remote UE.

Enhancements to enable reliable unicast PC5 link to at least support low power, low rate and low complexity/cost devices: Low-cost D2D devices may be enabled by reusing ideas developed during narrowband IoT (NB-IoT) and eMTC research. For example, an NB-IoT/eMTC uplink waveform may be reused for D2D. These devices will potentially use a single modem to communicate with the Internet/cloud and to communicate with proximal devices. Current PC5 link designs, inherited from broadcast-oriented designs led by public safety use cases, shows a bottleneck phenomenon that hinders low power and stable D2D communication due to lack of link adaptation and feedback mechanisms. This drawback does not allow achievement of target performance metrics of wearable devices and MTC use cases in terms of power consumption, spectral efficiency, and device complexity. In general, a reduction in power consumption and lower complexity are key attributes of the wearable devices and MTC use cases that typically feature small form factors and long battery life.

<UNI-Directional Relay>

For example, a uni-directional relay refers to a situation in which data generated by the remote UE undergoes a relay process but data which is generated in a network and reaches the BS is directly delivered to the remote UE without the relay process in a situation where the remote UE far away from the BS is delivering data thereof to the BS through a relay operation provided by a relay UE relatively close to the BS. That is, the remote UE transmits the data to be transmitted to the relay UE through the sidelink and the relay UE transmits the data to the BS through uplink. The BS immediately transmits the data to be transmitted to the remote UE through downlink without a relay operation. This uni-directional relay operation has the advantage of reducing time delay of the downlink data as the downlink is continuously received, while reducing battery consumption, because the remote UE transmits it with low power to the adjacent relay UE. Also, sidelink generally includes the same or similar waveform in the same frequency domain as uplink. Although it is simple for a UE with uplink transmission function to have additional sidelink transmission, but considerable implementation cost may incur to have a sidelink reception function in addition to the downlink reception function. In this case, if the uni-directional relay is performed, the remote UE does not need to have the sidelink reception function, thereby reducing the implementation cost.

For example, in order to smoothly operate the downlink between the BS and the remote UE and the sidelink between the remote UE and the relay UE, feedback information on a corresponding LINK is required. The feedback information is as follows.

DATA DECODING RESULT: HARQ-ACK is a typical example of information indicating whether decoding of the data received through LINK is successful. When the receiving end (receiver) feeds back the information to the transmitting end (transmitter), the transmitter may retransmit the decoding failed data.

measurement RESULT: Information indicating quality of the corresponding link, such as reference signal received power (RSRP), reference signal received quality (RSRQ), channel status information (CSI), and pathloss. When the receiver measures this and feeds it back to the transmitter, the transmitter may adjust the amount of resources used for transmission or a modulation and coding scheme to be optimal for the LINK quality by utilizing the information.

In the case of the uni-directional relay described above, a proper design of such feedback is required because when one device transmits to another device, transmission in the opposite direction is not allowed and only relaying through a third device is possible. For example, in the case of downlink, feedback information generated by the remote UE cannot be directly transmitted to the BS and may be transmitted only through the relay UE.

Hereinafter, for convenience of understanding, an example of a uni-directional relay and a bi-directional relay will be described with reference to the drawings.

Figure 9:
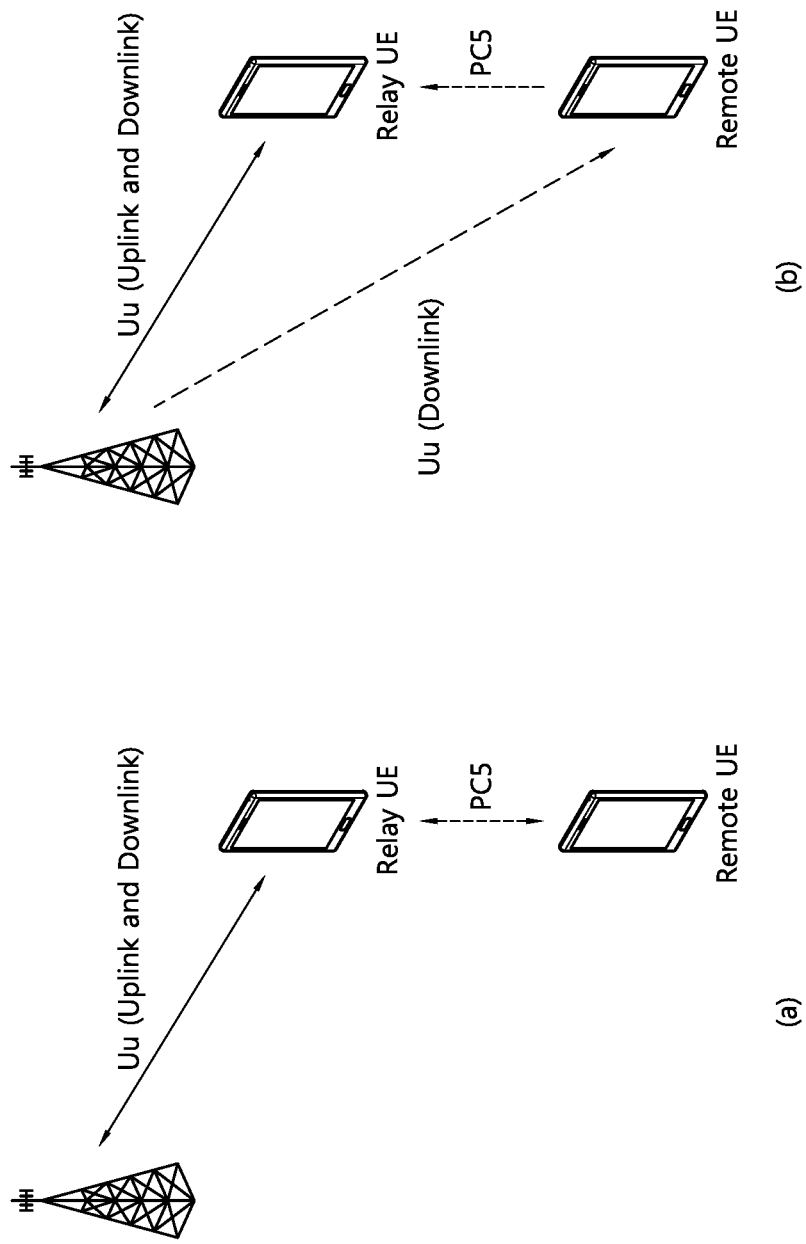
FIG. 9 schematically shows an example of a uni-directional relay and a bi-directional relay.

FIG. 9 schematically shows an example of a uni-directional relay and a bi-directional relay.

FIG. 9(a) schematically illustrates an example of a bi-directional relay. According to FIG. 9(a), the BS and the relay UE may perform uplink and downlink communication based on a Uu interface. In addition, the relay UE and the remote UE may perform mutual sidelink communication based on a PC5 interface. That is, the relay UE relays both uplink and downlink UE-specific data of the remote UE.

FIG. 9(b) schematically illustrates an example of a uni-directional relay. According to FIG. 9(b), the BS and the relay UE may perform uplink and downlink communication based on the Uu interface as in the bi-directional relay described above. Here, the remote UE may directly perform downlink communication from the BS, but in the case of uplink communication, relaying through a relay UE is required. That is, the relay UE relays uplink data of the remote UE.

Although not separately illustrated, unlike FIG. 9(b), the uni-directional relay may also be configured in a relay form for only downlink data of the remote UE.

For example, an example of UE capability related to a uni-directional/bi-directional relaying operation or an example of a mechanism for efficiently supporting such a relaying operation is illustrated hereinafter.

The evolved UE-network relay UE may support all downlink/uplink/sidelink system bandwidth capabilities (i.e., a system bandwidth of 1.4 MHz and above may be supported).

In addition, two types of remote UEs may be considered.
Type 1: UEs that have DL and SL reception capabilities.
Type 2: UEs that do not have SL reception capabilities.
In addition, low complexity remote UEs may have single RX chain. In the uni-directional relaying case, the chain may be fixed to DL or FFS switched to SL for discovery. In the bi-directional relaying case, the receiver chain may be switched between DL and SL for discovery and communication.

In addition, in-coverage relay UE may serve as a synchronization source for in-coverage remote UE).

In addition, the following sidelink unicast communication may be considered.

eNB controlled resource allocation and configuration for communication between relay UE and remote UE. ENB decision on resource allocation is relayed to the remote UE by the relay UE).

Relay UE assisted resource allocation and configuration under eNB control

Remote UE assisted resource allocation

In addition, there may be no new sidelink physical channel to be introduced solely to provide feedback. Piggyback in existing channels is not precluded.

Also, the following feedback information between receiving and transmitting UEs for sidelink link adaptation may be considered.

Decoding status, taking into account the impacts on complexity and remote UE power consumption.

Adaptation of MCS, number of (re)transmissions and resource for transmission. Here, sidelink CSI feedback may be considered.

Sidelink measurements, e.g., SL-RSSI/RSRP/RSRQ).

Sidelink power control taking into account propagation characteristics between relay UE and remote UE is further studied. Propagation characteristics may include sidelink pathloss, received signal quality, interference level etc.

Three sidelink resource configuration options may be further considered.

TDM between PSCCH/PSSCH from UE and system perspective (similar to R12).

FDM between PSCCH/PSSCH from UE and system perspective (similar to R14).

FDM between PSCCH/PSSCH from system perspective but TDM from UE perspective

Hereinafter, the present disclosure will be described.

Basically, a narrowband remote UE transmits its own information (e.g., WAN communication related information) to a BS through a sidelink relaying operation of a relay UE. This is because there is a benefit in terms of reliability/battery consumption as compared to a case where the narrow-band remote UE directly transmits to a BS through a wide area network (WAN) uplink (UL).

Under such a purpose, there is a need for a method in which the relay UE transmits information of the narrow-band remote UE (having at least previously set high priority) with high reliability.

If not, unnecessary retransmission of information of the narrow-band remote UE may occur, so that the above-described benefit (especially, battery saving) cannot be obtained and motivation of the sidelink relaying operation of the relay UE is also weakened.

Accordingly, in consideration of the above-described purpose, the present disclosure is to provide examples of a method in which the relay UE transmits information of the narrow-band remote UE (having at least the predetermined high priority) with high reliability.

As an example, the following schemes suggest a method for efficiently transmitting (control/feedback/data) information related to WAN communication and/or SL communication (under a sidelink relaying environment).

Here, as an example, in the present disclosure, "remote-UE" wording may be interpreted at least as a UE having transmission (and/or reception) capability of a limited size band (e.g., 6(/1) RB) (relatively) limited (as compared with the relay-UE).

Here, as an example, the D2D (/V2X) communication mode may be (typically) classified as (A) a mode in which the BS signals (/controls) scheduling information related to D2D (/V2X) message transmission (reception) (on a predetermined (/signaled) D2D (/V2X) resource pool (from BS (/network)) (e.g., a UE located in BS communication coverage (and/or in an RRC_CONNECTED state) is a primary target) and/or (B) a mode in which the UE (independently) determines (/controls) scheduling information related to D2D (/V2X) message transmission (/reception) (on a predetermined (/signaled) D2D/V2X) resource pool (from BS/network)) (e.g., a terminal located in/outside the BS communication coverage (and/or in an RRC_CONNECTED/IDLE state) is a main target).

Here, as an example, in the present disclosure, the "sensing operation" wording may be interpreted (See Table 3.1) such as a (decoding-successful PSCCH-scheduling) PSSCH DM-RS sequence-based PSSCH-RSRP measurement operation and/or (D2D (/V2X) resource pool related subchannel-based) S-RSSI measurement operation, or the like.

Here, as an example, the "receive" wording in the present disclosure may be interpreted (extendedly) to (at least) one of (A) D2D (/V2X) channel (/signal) (e.g., PSCCH, PSSCH, PSBCH, PSSS/SSSS, etc.) decoding (/receiving) operation (and/or WAN DL channel (/signal) (e.g., PDCCH, PDSCH, PSS/SSS, etc.) decoding (/reception) operation and/or (B) sensing operation and/or (C) CBR measurement operation. Here, as an example, "transmit" wording in the present disclosure may be (extendedly) interpreted as a D2D (/V2X) channel (/signal) (e.g., PSCCH, PSSCH, PSBCH, PSSS/SSSS, etc.) transmission operation (and/or WAN UL channel (/signal) (e.g., PUSCH, PUCCH, SRS, etc.) transmission operation.

Here, as an example, in the present disclosure, the "carrier" wording may be (extendedly) interpreted as (A) a preset carrier set (/group) and/or (B) D2D (/V2X) resource pool or the like.

Here, as an example, in the present disclosure, the "RS" wording may be interpreted (at least) as DM-RS.

Here, in one example, "scrambled" wording may be interpreted (at least) as PSSCH (/PSCCH) scrambling.

In the present disclosure, the following situation may be considered.

(1) First, a case where a narrow-band remote-UE (M-UE) (e.g. 6RB) transmits at least one of the information listed below to the relay-UE (R-UE) through a sidelink (SL) (e.g. PSSCH, PSCCH, or PSDCH) may be considered. Specific examples of each information may be as follows.

Feedback/control/data information related to WAN communication of M-UE:

For example, (own) WAN DL HARQ-ACK information, WAN DL CSI information, WAN UL DATA information, WAN UL SR information Feedback/control information related to SL communication (between M-UE/R-UE):

For example, decoding status information related to (specific) SL channel/signal reception transmitted by R-UE, Or, for example, SL measurement (e.g., SL-RSSI/RSRP/RSRQ) information or SL CSI feedback information (measured by the M-UE), Or, for example, SL link adaptation information related to (specific) SL channel/signal transmission of R-UE (e.g., MCS, re-transmission number, TX resource, SL TX power control (TPC) parameter (e.g., P_O, ALPAH), etc.).

For example, the SL link adaptation information may be determined (by the M-UE or BS) on the basis of information such as SL decoding status, SL measurement, SL CSI feedback (derived/measured by the M-UE or fed back from R-UE).

(2) Case where the R-UE transmits at least one of the information listed below to the BS through a WAN UL (e.g., PUSCH, PUCCH) (e.g., corresponding information transmitted by the R-UE may be (finally) transferred to the M-UE through the BS) may be considered. Specific examples of each information may be as follows.

Feedback/control/data information related to WAN communication of R-UE

Feedback/control/data information related to WAN communication of M-UE:

For example, WAN DL HARQ-ACK information related to M-UE (received from M-UE through SL), WAN DL CSI information, WAN UL DATA information, and WAN UL SR information.

Feedback/control information related to SL communication (between M-UE/R-UE) (e.g., the corresponding information may also be sent directly to the M-UE by the R-UE via SL):

For example, decoding STATUS information related to (specific) SL CHANNEL/SIGNAL reception transmitted by M-UE, Or, for example, SL measurement information or SL CSI feedback information (measured by R-UE), Or, for example, SL link adaptation information related to (specific) SL CHANNEL/SIGNAL transmission of the M-UE. For example, the SL link adaptation information may be determined (by the R-UE or BS) on the basis of the information such as SL decoding STATUS, SL measurement, SL CSI feedback or the like (derived/measured by the R-UE or fed back from the M-UE)

For example, some cases described above may occur (limitedly) only in a uni-directional relaying (or bi-directional relaying) environment.

For example, in order to maximize SL relaying gain/utility or improve SL communication quality, a mechanism for reliably transmitting (/relaying) information related to "SL communication" or "WAN DL/UL communication" described above within a short time may be necessary. For example, for convenience of description, a term "piggyback" may be interpreted as transmitting the information in the form of puncturing (or rate-matching) through a predefined channel/signal.

A method for reliably transmitting information of a narrow-band remote UE (having at least a predetermined high priority) by the relay UE in the consideration situation described above will be described with reference to the accompanying drawings.

Figure 10:
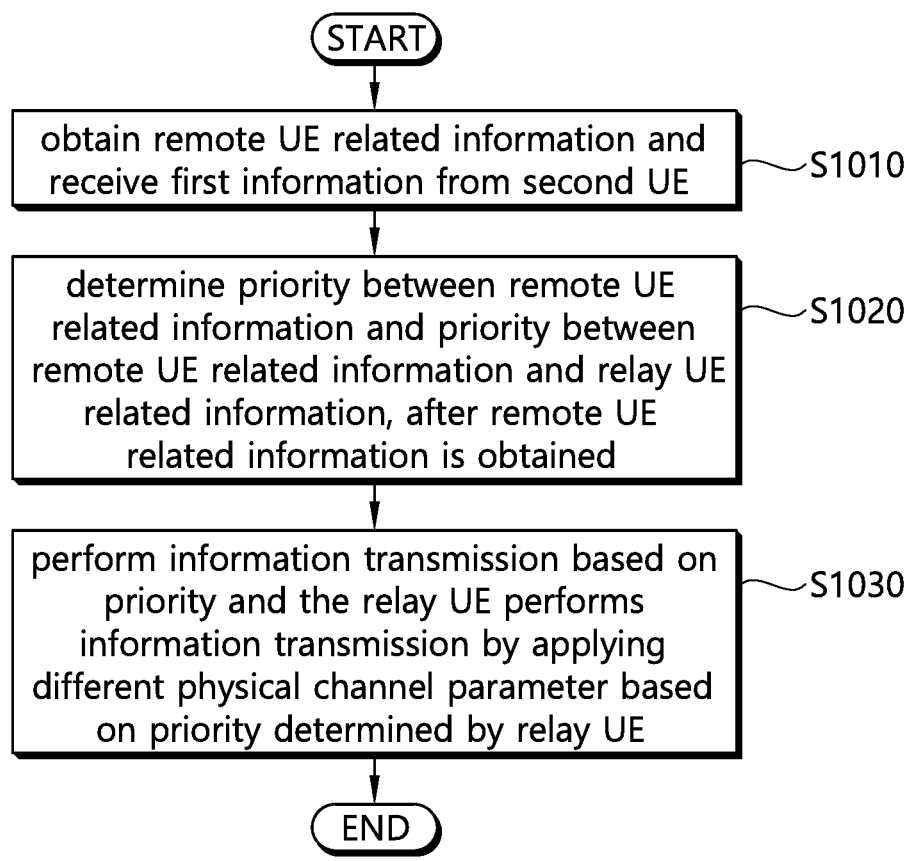
FIG. 10 is a flowchart of an information transmitting method performed by a relay UE according to an embodiment of the present disclosure.

FIG. 10 is a flowchart of an information transmitting method performed by a relay UE according to an embodiment of the present disclosure.

According to FIG. 10, the relay UE may obtain remote UE related information (S1010). Here, the remote UE may be a terminal having a communication capacity of a limited size band.

Examples of the remote UE related information obtained by the relay UE are as described above. The information may be transmitted by the remote UE to the relay UE through the sidelink channel and, for example, WAN communication-related feedback/control/data information of the remote UE may correspond thereto. In addition, it may be feedback/control information related to sidelink communication transmitted by the relay UE for the remote UE and, for example, information on whether reception/decoding is successful for the sidelink channel transmitted by the remote UE and sidelink CSI/measurement information may correspond thereto. Here, the feedback/control information related to the sidelink communication may be directly transmitted from the relay UE to the remote UE through the sidelink channel. Hereinafter, specific examples have been described above, and thus, redundant description thereof will be omitted.

In addition, the method may be applied to a uni-directional relay situation as described above. That is, the remote UE may be a UE which transmits the information related to the remote UE to the BS through a relay process of the relay UE, and receives information transmitted by the BS (via WAN downlink) without a relay process of the relay UE.

After obtaining the remote UE related information, the relay UE may determine priority between the remote UE related information and priority between the remote UE related information and the relay UE related information (S1020).

In one example, the relay UE may determine priority between the remote UE related information and the information of the relay UE.

For example, when the remote UE related information is wide area network (WAN) related control information or feedback information of the remote UE, the relay UE may determine the remote UE related information to have priority over the WAN communication related data information of the relay UE and transmit the WAN related control information or feedback information of the remote UE to the BS. Hereinafter, specific examples of the contents will be described later for convenience of description.

For example, the relay UE may determine priority among the remote UE related information.

For example, the relay UE may determine that, among the remote UE related information, the sidelink communication control information or feedback information for the remote UE has priority over the WAN related control information of the remote UE, and the relay UE may transmit the WAN related control information or feedback information for the remote UE to the BS. Or, for example, the relay UE may determine that, among the remote UE related information, the WAN related control information or feedback information of the remote UE has priority over the sidelink communication related control information or feedback information, and the relay UE may transmit the WAN related control information or feedback information of the remote UE to the BS. Here, the WAN related control information or feedback information may include WAN downlink channel state information (CSI), WAN downlink HARQ-ACK information, or WAN uplink scheduling request (SR) of the remote UE, and the sidelink communication related control information or feedback information may include decoding state information, sidelink CSI information, or sidelink measurement information for the sidelink channel received from the remote UE. Hereinafter, specific examples of the contents will be described later for convenience of description.

Thereafter, the relay UE may perform information transmission based on the priority (S1030). In this case, the relay UE may perform the information transmission by applying different physical channel parameters based on the priority determined by the relay UE. In this case, the relay UE may transmit specific information to the BS or the remote UE.

For example, the relay UE may transmit the remote UE related information together with the information of the relay UE through a predefined channel, and the predefined control information or feedback information may be piggybacked and transmitted to the predefined channel. Hereinafter, specific examples of the contents will be described later for convenience of description.

For example, the relay UE may transmit the information by applying different beta offset values according to the priority, and the beta offset may be a parameter for adjusting the number of modulated symbols used for information transmission. In this case, the relay UE may allocate a greater number of modulated symbols to higher priority information transmission. Hereinafter, specific examples of the contents will be described later for convenience of description.

For example, the relay UE may transmit the information by applying different power parameters according to the priority, and the relay UE may allocate more power to the transmission of the information having a higher priority. Hereinafter, specific examples of the contents will be described later for convenience of description.

For example, the relay UE may transmit the information by applying a different modulation and coding scheme (MCS) value according to the priority, and the relay UE may apply a relatively high MCS value to the transmission of the low priority information. Hereinafter, specific examples of the contents will be described later for convenience of description.

For example, the relay UE may add a different cyclic redundancy checksum (CRC) to the information related to each remote UE, and each CRC related parity bit may be scrambled by a distinguished ID of each remote UE. Hereinafter, specific examples of the contents will be described later for convenience of description.

The flowchart of FIG. 10 is mainly described from the perspective of the relay UE. However, this is only describing the operation in which the relay UE is a subject for convenience of description. For example, the flowchart of FIG. 10 may be operated from the perspective of the remote UE (or BS). That is, in the present disclosure, not only embodiments of the method in which the relay UE is a subject but also embodiments of the method in which the remote UE is a subject is also supported.

Hereinafter, more specific examples of FIG. 10 will be described.

(Rule #1) When (some of) the information is (piggyback) transmitted through a predefined channel/signal, different (or independent) BETA OFFSET values (e.g., a parameter that controls the number of modulated coded symbol (CM_SYMBOL) used for information transmission) may be set (/signaled) according to the priority or type of the corresponding information (e.g. a reception success rate may be further increased by allocating more CM_SYMBOLs to higher priority information transmission (e.g., an effect of lowering an effective coding rate)).

Example) Priority between (some of) the information may be defined according to the following (some) rules (e.g., the expression "X>Y" means that X has a higher priority than Y, and also, the case that the sign direction is opposite (or equal sign) is covered by the proposal of the present disclosure, although not shown)

WAN communication related information>SL communication related information, or SL communication related control/feedback information>WAN communication related data information, WAN communication related control/feedback information>SL communication related control/feedback information, SL decoding STATUS information>SL CSI feedback (/SL measurement/SL link adaptation) information, or SL link adaptation (/SL measurement)>SL decoding STATUS information>SL CSI feedback information, or SL COMMUNICATION related information>SL DISCOVERY related information, or information of long transmission/reporting period>information of short transmission/reporting period WAN DL HARQ-ACK information (=WAN UL SR information)>WAN DL CSI information (>WAN UL DATA information)

Information related to WAN communication of its own (e.g., R-UE)>information related to WAN communication of another relaying UE (e.g., M-UE) (or SL communication related information of its own>SL communication related information of another (relaying) UE), or control/feedback information related to WAN communication (or SL communication) of another (relaying) UE>WAN communication related data information of its own, WAN communication related control/feedback information of its own>WAN communication related data information of another (relaying) UE.

For example, when (some of) the information is (piggyback) transmitted, preset (/signaled) different (or independent) MCS values may be applied according to the priority or type of the information (e.g. the influence due to piggyback of the corresponding information may be reduced by applying a higher MCS value to lower priority information transmission.

For example, the priority may be extended for power allocation (or omitting transmission) priority determination between (some or all) overlapping information transmissions on different (CA) CELLs (e.g., it may be (limitedly) applied only to POWER LIMITED CASE).

(Rule #2) When (some of) the information is (piggyback) transmitted through a predefined channel/signal, a preset (/signaled) different (or independent) POWER CONTROL PARAMETER (e.g. OPEN-LOOP TPC PARAMETER (e.g. P_O, ALPHA), MAX TX POWER value, MIN.GUARANTEED POWER, etc.) (or additional TX POWER OFFSET value) may be applied (to achieve transmission/reception success within a short time or with a small number of (re)transmissions), as compared to an otherwise case.

For example, the corresponding POWER CONTROL PARAMETER (or additional TX POWER OFFSET value) may be set (/signaled) differently (or independently) according to the priority or type for each information described in (Rule #1). (e.g. LOWER LATENCY/DELAY, HIGHER RELIABILITY transmissions are possible by allocating more power to transmit higher priority information).

(Rule #3) When (some of) the information (e.g., (particularly) SL decoding STATUS information, WAN DL HARQ-ACK information, etc.) is (piggyback) transmitted through a predefined channel/signal, whether to apply SPATIAL (/TIME) BUNDLING may be set (/signaled) (e.g., when SPATIAL (/TIME) BUNDLING is applied, reliability of transmission/reception success may be relatively low but the influence due to piggyback of the corresponding information may be reduced).

For example, whether to apply the corresponding SPATIAL (/TIME) BUNDLING may be set (/signaled) differently (or independently) according to the priority or type of the information described in (Rule #1). (e.g., the form in which SPATIAL (/TIME) BUNDLING is applied to the transmission of low priority information)

(Rule #4) When a specific UE (e.g., R-UE) (piggyback) transmits (some of) the information (e.g., WAN communication related feedback/control information, SL communication related feedback/control information of the M-UE, etc.) through a predefined channel/signal (e.g., PUSCH), even though there is no (WAN communication related) CONTROL (piggyback) transmission of its own, the specific UE may regard it as having the same priority (e.g., POWER ALLOCATION/DROPPING PRIORITY) as "CONTROL DATA SENT VIA PUSCH WITH (OR WITHOUT) UL-SCH" (or "PUCCH W/HARQ-ACK (OR CSI)") (or its own) (e.g., to efficiently protect it in spite of different UE related control/feedback information).

For example, whether to apply the corresponding rule may be set (/signaled) differently (or independently) according to the priority or type for each information described in (Rule #1) (e.g., the form applied only for transmission of high priority information).

For example, when (some of) the information is (piggyback) transmitted through the SL channel/signal, the corresponding SL channel/signal transmission may be (A) set (/signaled) with a higher priority than (preset (/signaled) specific) WAN UL transmission (e.g., WAN UL transmission is omitted when collision (/time) overlapping occurs) or (B) set (/signaled) with a higher priority than other (remaining) SL channel/signal transmission (excluding transmission of preset (/signaled) specific SL channel/signal (e.g., SLSS) transmission (e.g., other (remaining) SL channel/signal transmission is omitted when collision (/time) overlapping occurs). Here, as an example, whether to apply the corresponding rule may be set (/signaled) differently (or independently) according to the information priority or type described in (Rule #1) (e.g., the form applied only for transmission of high priority information).

In order to help the understanding of the proposed method described above, the above contents will be described with reference to other drawings as follows.

Figure 11:
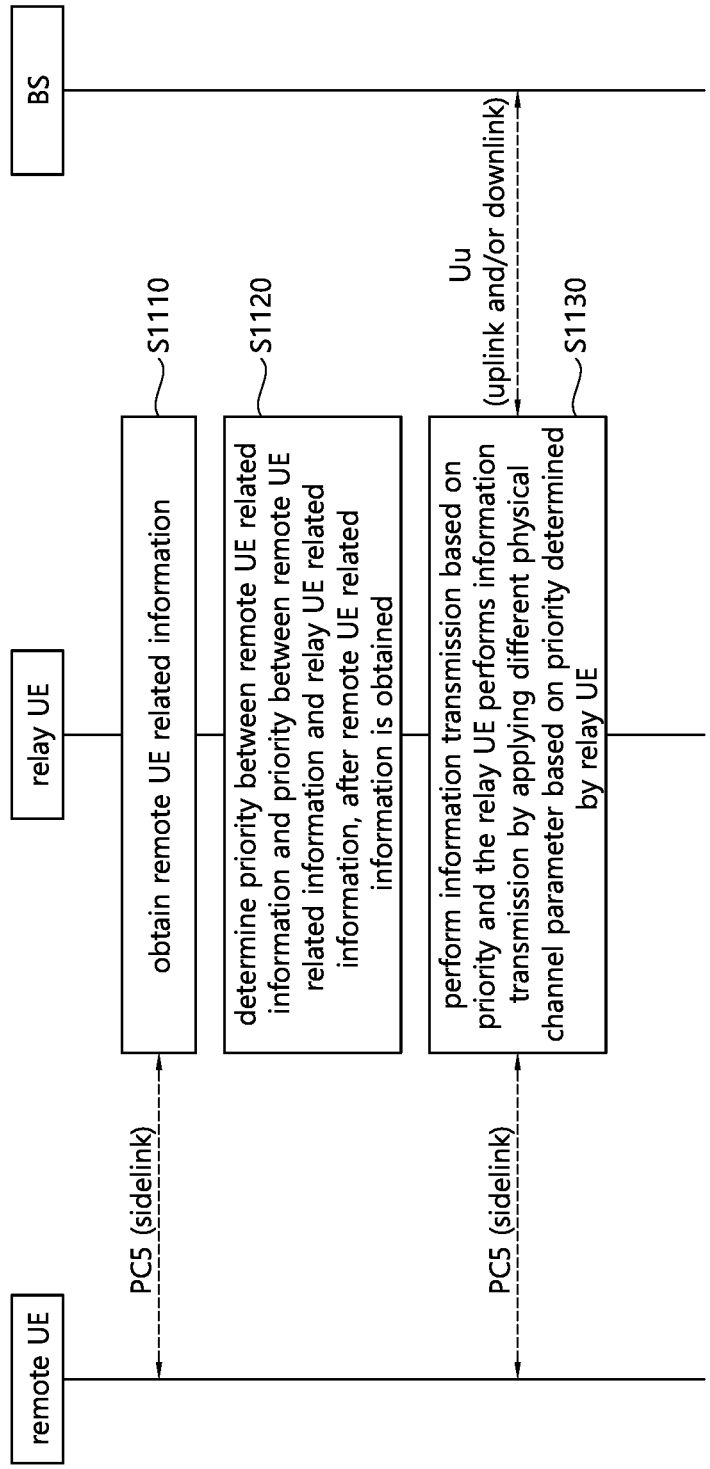
FIG. 11 is a flowchart of an information transmitting method performed by a relay UE according to another embodiment of the present disclosure.

FIG. 11 is a flowchart of an information transmitting method performed by a relay UE according to another embodiment of the present disclosure.

According to FIG. 11, the relay UE may obtain remote UE related information (S1110). Here, an example of the present content is as described above, and description of overlapping contents will be omitted for convenience of description.

Thereafter, after obtaining the remote UE related information, the relay UE may determine a priority between the remote UE related information and a priority between the remote UE related information and the relay UE related information (S1120). Here, an example of the present contents is as described above, and description of overlapping content will be omitted for convenience of description.

The relay UE may transmit the information based on the priority, and here, the relay UE may perform information transmission by applying different physical channel parameters based on the priority determined by the relay UE (S1130). Here, an example of the present contents is as described above, and description of overlapping contents will be omitted for convenience of description.

In the method for reliably transmitting the information of a narrow-band remote UE (having at least previously set high priority) by the relay UE described above with reference to the plurality of drawings, the following configurations may be additionally (or separately) considered.

When (some of) the information (related to other UE (e.g., M-UE) as well as itself is (piggyback) transmitted through a predefined channel/signal by a specific UE (e.g., R-UE), (A) SEPARATE (CHANNEL) CODING may be applied or (B) preset (/signaled) different (/independent) BETA OFFSET value (or MCS value) may be applied between different UE information (or different type (/kind) information or different PRIORITY information).

Example) In another example, in the above case, predefined CHANNEL CODING may be applied or the same BETA OFFSET value (or MCS value) set (/signaled) in advance may also be applied.

Example) In another example, in the above case, CM_SYMBOL of different UE information (or CM_SYMBOL of different type (/kind) information or CM_SYMBOL of different PRIORITY information) may be interleaved and FREQUENCY-FIRST (or TIME-FIRST) mapped.

Example) In another example, in the above case, the CRC may be (independently) generated/added between different UE information (or different type (/kind) information or different PRIORITY information). Here, as an example, the CRC PARITY BIT may be scrambled (or masked) by a predefined "information type (/kind) distinguishing indicator" (or "information PRIORITY distinguishing indicator" or "UE differentiating ID (/indicator)").

In the case of a UE (e.g., R-UE) available for simultaneous PUCCH/PUSCH transmission, the UE may be configured (/signaled) to transmit its WAN communication (and/or SL communication) related control/feedback information (e.g., WAN DL HARQ-ACK (/CSI), etc.) (always) on a PUCCH, and (always) (piggyback) transmit (some of) the information (and/or its SL communication related information) related to other UEs (always) on PUSCH.

If the BS (re)transmits (some of) the information related to the (plurality of) IN-COVERAGE M-UE received from the R-UE to the M-UE (via WAN DL), (some) rules of the following may be applied.

Example) A common GROUP-RNTI value may be set (/signaled) to a plurality of M-UEs, and the plurality of corresponding M-UE related information may be included/transmitted (together) on a PDSCH to which a DCI (e.g., which may be size-fit to a DCI 0 (/1A) on a CCS with the same payload length) (blind) decoded by the corresponding GROUP-RNTI value (e.g., which may be configured as a form of MAC CE and "M-UE distinguishing ID (/Indicator) field" may be defined).

For the convenience of understanding, an example in which the BS (re)transmits (some of) the information related to the (plurality of) IN-COVERAGE remote UE received (/relayed) from the relay UE to the remote UE (via WAN DL) will be described below with reference to the drawings.

Figure 12:
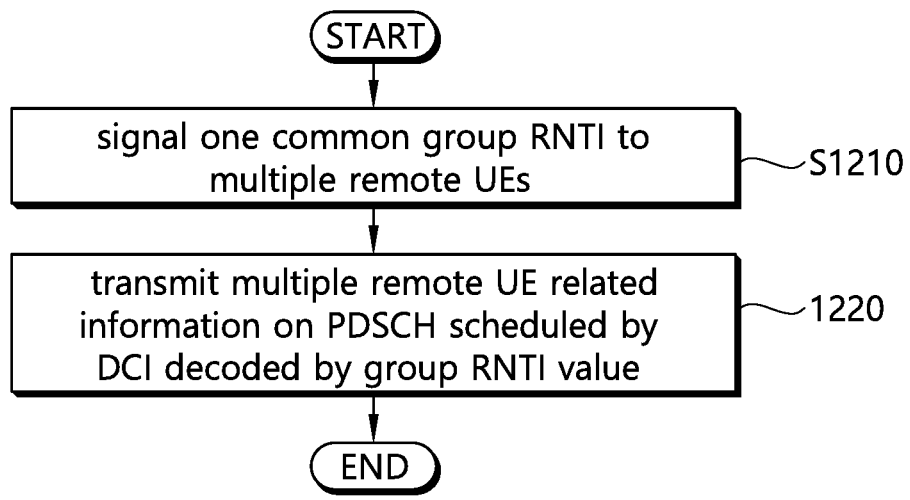
FIG. 12 is a flowchart illustrating a method of transmitting a plurality of remote UE related information performed by a BS according to an embodiment of the present disclosure.

FIG. 12 is a flowchart illustrating a method of transmitting a plurality of remote UE related information performed by a BS according to an embodiment of the present disclosure.

According to FIG. 12, the BS may signal one common group RNTI to a plurality of remote UEs (S1210). Hereinafter, description of overlapping contents will be omitted for convenience of explanation.

Thereafter, the BS may transmit the plurality of remote UE related information on the PDSCH scheduled by the DCI decoded by the group RNTI value (S1220). In this case, the information transmitted from the BS to the remote UE may be interpreted as (multiple) IN-COVERAGE remote UE related information (e.g., received (/relayed) from the relay UE (e.g., information indicating whether a sidelink channel transmitted from the remote UE is successfully received/decoded, etc.). Hereinafter, description of overlapping contents will be omitted for convenience of description.

FIG. 12 illustrates an embodiment of the present disclosure from the perspective of a BS for convenience of description. However, this is merely for convenience of explanation and embodiments of the present disclosure may also be described from the perspective of a relay UE or a remote UE.

For example, although not separately illustrated, referring to the example of FIG. 12 from the perspective of a remote UE, the remote UE may receive a group RNTI signaled from the BS. Thereafter, the remote UE may receive the remote UE related information from the BS on the PDSCH scheduled by the DCI decoded by the group RTNI value.

As described above, when the BS (re)transmits (some of) the information related to the (plurality of) IN-COVERAGE remote UEs received (/relayed) from the relay UE to the remote UE (through WAN DL) based on the group RNTI, there is an effect that the BS quickly schedules the corresponding information to the plurality of remote UEs.

In addition, the embodiment of FIG. 12 may be combined with the embodiments of FIGS. 10 to 11 described above.

For example, although not separately illustrated, the remote UE may transmit specific information (via a sidelink channel) to the relay UE, and the relay UE may relay the specific information related feedback/control information to the BS based on a priority (after applying different physical channel parameters). Thereafter, the remote UE may receive the specific information related feedback/control information from the BS through a PDSCH scheduled by the DCI decoded by the (preset) group RNTI value. Here, the information that the remote UE receives from the BS through the relay operation of the relay UE is as described above. Hereinafter, for convenience of description, repeated description of the above description will be omitted.

- Information having a payload length below a preset (/signaled) threshold value, information having a PRIORITY above the preset (/signaled) threshold value, or a preset (/signaled) type (/kind) information may be regarded as (relatively important) "CONTROL (/feedback)" information (e.g., piggyback transmission), and other information (e.g. UE distinguishing ID (/indicator) information, etc.) may be regarded as "DATA" information (e.g., transmitted in MAC CE form)
- When (some of) the information is (piggyback) transmitted through a predefined channel/signal, a preset (/signaled) different BETA OFFSET value (or MCS value) may be applied depending on whether the (full) payload length exceeds the preset (/signaled) threshold (e.g., a relatively large BETA OFFSET value is applied when exceeding the threshold value).
- "SEPARATE TPC ACCUMULATION" may be set (/signaled) between a case where (some) information is (piggyback) transmitted and an otherwise case, through a predefined channel/signal.

Example) In the case of DCI 3/3A (e.g., UE-GROUP TPC DCI), two (independent) "TPC field index information" for the former and the latter may be designated to a specific UE (through higher layer signaling).

- For efficient transmission of (some of) the information, (WAN UL) SPS resources may be independently (or additionally) configured (/signaled).

Example) In the case of DCI 3/3A, "TPC field index information" for SPS-related TX POWER CONTROL (for new use) may be additionally designated to a specific UE (through higher layer signaling).

Example) The SPS related BSR (/SR) transmission (for new use) may be additionally designated.

- Similar to the existing aperiodic CSI only (W/O UL-SCH) triggering DCI, triggering (/scheduling) DCI (e.g. which may be size-fit to the same payload length as the DCI 0(/1A) on the same search space) may be newly defined (e.g., an additional RNTI value may be set (/signaled) for (new) DCI blind detection for the corresponding use)

If a payload size (AC/PAYSIZE) of (some of) the information to be transmitted is larger than a maximum payload size value (MAX_PAYSIZE) allowed (or supported) by a channel/signal (e.g. PUCCH) to be used (e.g., which can be calculated by the product of a preset (/signaled) (per UE) code rate value and an available physical channel bit), (A) the low priority information (or preset (/signaled) specific type (/kind) information (or specific priority information or specific UE information)) described in (Rule #1) may be preferentially dropped (or spatial (/time) bundled) until the AC_PAYSIZE becomes smaller or equal to the MAX_PAYSIZE) or (B) only preset (/signaled) specific type (/kind) information (or specific priority information or specific UE information) may be (limitedly) transmitted.

Example) A UE (e.g., an R-UE) may be allowed to perform a PUCCH FORMAT ADAPTATION (/SELECTION) in consideration of only the amount of own WAN(/SL) communication related (feedback/control) information (or in consideration of the amount (/transmission) of WAN (/SL) communication related (feedback/control) information of another UE).

Example) The (PER UE) CODE RATE value may be set (/signaled) differently according to the POWER LIMITED CASE (e.g., a relatively low value may be designated in the case of POWER LIMITED CASE).

For example, the R-UE may be allowed to report (some of) the information to a BS through a predefined channel/signal (e.g., PUSCH (/PUCCH)) and the BS may determine the "SL POWER LEVEL/PARAMETER" (e.g., P_O, ALPHA, MAX TX POWER values) based on the received information. Here, for example, the determined "SL POWER LEVEL/PARAMETER" may be (A) signaled (directly) by the BS to the (related) M-UE through the WAN DL or (B) signaled by the BS to the R-UE (through WAN DL) and signaled by the R-UE to a (related) M-UE through SL.

In case where a specific UE (e.g., M-UE) having no simultaneous PUCCH/PUSCH transmission capability needs to piggyback PUCCH information to the PUSCH due to overlapping PUCCH/PUSCH transmission timing (or in case where a specific UE (e.g., M-UE) having simultaneous PUCCH/PUSCH transmission capability performs PUCCH/PUSCH simultaneous transmission, if it selects SL relaying based transmission (/help), PUSCH information (e.g. DATA (UL-SCH)) may be transmitted to SL (R-UE) and PUCCH information (e.g., UCI) may be transmitted (to the BS) by WAN UL (by being-TDMed).

For example, SUBBAND-SPECIFIC (or POOL-SPECIFIC) SL measurement (e.g., SL-RSSI/RSRP/RSRQ) (of the same POOL) and/or REPORT operation enables selection of subband (or pool) of relatively good condition (/quality) (e.g., LOWER INTERFERENCE LEVEL) in consideration of (some) different interference environments for subbands (or pools). Here, for example, the corresponding measurement/reporting operation may be defined to follow the (some) rules below.

Example) The R-UE may inform the M-UE (or the BS may inform the UE) about configuration information related to the measurement (/report) (e.g., (SUBBAND-SPECIFIC) measurement (/report) period (/pattern) (e.g., INTER-SUB- BAND measurement (/report) period (/pattern)), (SUBBAND-SPECIFIC) measurement (/report) related subframe offset, (SUBBAND-SPECIFIC) (minimum) measurement time length (/section) information, etc.) through predefined signaling (e.g., PSCCH (/PSSCH), PSDCH (/PBCH), SIB (/RRC)).

Example) The measurement (/report) form may be configured (/signaled) to be SUBFRAME-SET SPECIFIC while being SUBBAND-SPECIFIC.

Example) The measurement (e.g., SL-RSSI) may be configured (/signaled) to be performed only on (data) symbols except for the symbols used for SUBBAND switching (/transmit/receive switching/AGC SETTLING) and/or DM-RS symbols, or may also be performed only on a preset (/signaled) specific channel (/signal) (e.g., PSSCH (/PSCCH), PSDCH (/PBCH)).

Example) The M-UE may signal the measurement-related configuration information to the R-UE (e.g., in the case of uni-directional relaying).

Example) The M-UE may report information such as measurement resource location/pattern/averaged interval length (performed by itself) to the R-UE (e.g., reported together when reporting a measurement value).

Example) The UE performing the measurement may report directly to the BS (not another UE (via sidelink)) (via a predefined channel).

Example) When performing the measurement/reporting, it is possible to report only previously set (/signaled) K number of higher information (e.g., K having low interference level) (e.g., overhead reduction effect).

The above (some) rules may be applied only to POWER LIMITED CASE (or NON-POWER LIMITED CASE).

Whether the (some) rule is applied or related information may be (A) signaled by a specific (TX) UE to another UE through predefined signaling (e.g., PSCCH (/PSSCH), PSDCH, SIB (/RRC), etc.) or (B) (pre) configured by a network to the UEs (e.g., POOL(/CARRIER)-SPECIFIC form).

Since the examples of the proposed method described above may also be included as one of the implementation methods of the present disclosure, it is obvious that they may be regarded as a kind of proposed methods.

In addition, the proposed methods described above may be independently implemented or may be implemented as a combination (or merged form) of some of the proposed methods.

As an example, the proposed methods have been described based on the 3GPP LTE system for convenience of description in the present disclosure, the scope of the system to which the proposed method is applied may be extended to other systems in addition to the 3GPP LTE system.

For example, the proposed methods of the present disclosure may be extended and applied for D2D communication. Here, as an example, D2D communication refers to communication between a UE and another UE directly using a wireless channel, and here, for example, the UE refers to a terminal of a user, but network equipment such as a BS may also be regarded as a UE in case where the network equipment transmits/receives a signal according to a communication method between UEs.

Also, as an example, (some of) the proposed methods of the present disclosure may be limitedly applied only to Mode 1 (/3) D2D (/V2X) operation (and/or MODE 2 (/4) D2D (/V2X) operation).

Also, as an example, (some of) the proposed methods of the present disclosure may be limitedly applied to transmission of preset (/signaled) (specific) D2D (/V2X) channel (/signal) (e.g., a PSSCH (and/or (interworking) PSCCH and/or PSBCH).

Also, as an example, (some of) the proposed methods of the present disclosure may be limitedly applied only to a case where the PSSCH and the PSCCH (interworking therewith) are adjacent (and/or non-adjacent) on a frequency domain and transmitted (and/or a case where a preset (/signaled) MCS (and/or coding rate and/or RB) (value (/range))-based transmission is performed).

Also, as an example, (some of) the proposed methods of the present disclosure may be limited applied only to MODE #1 (/3) (and/or MODE #2 (/4)) D2D (/V2X) CARRIER (and/or (MODE #1) (/2) (/4 (/3))) SL (/UL) SPS (and/or SL (/UL) DYNAMIC SCHEDULING) CARRIER), Also, as an example, (some of) the proposed methods of the present disclosure may be (limitedly) applied only to a case where synchronization signal (transmission (and/or reception)) resource location and/or number (and/or D2D (/V2X) resource pool related subframe location and/or number between carriers (and/or subchannel size and/or number) is the same (and/or (some) different).

Further, as an example, (some of) the proposed methods of the present disclosure may be (limitedly) applied only to a remote UE (and/or a relay UE) related to uni-directional relaying (and/or bi-directional relaying).

Also, as an example, (some of) the proposed methods of the present disclosure may be (limitedly) applied only to the (D2D) COMMUNICATION operation (and/or the (D2D) DISCOVERY operation).

Figure 13:
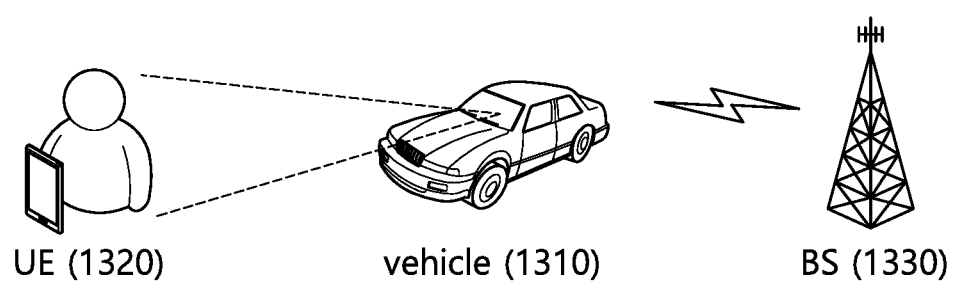
FIG. 13 shows an example of a scenario in which an embodiment of the present disclosure may be implemented.

FIG. 13 shows an example of a scenario in which an embodiment of the present disclosure may be implemented.

According to FIG. 13, a vehicle 1310 capable of performing a D2D operation, a terminal (UE) 1320 of an occupant of the vehicle, and a BS 1330 to which the terminal and the vehicle may be connected are schematically illustrated. Here, for example, the relay UE described above may be the vehicle, the remote UE described above may be the terminal.

Here, for example, a message transmitted to the terminal of the occupant may be transmitted to the vehicle (specifically, a modem of the vehicle) and the vehicle may transmit the message to the terminal using sidelink communication.

Meanwhile, in FIG. 13, the D2D operation between the terminal and the vehicle is taken as an example. However, an example in which an embodiment of the present disclosure is implemented is not limited thereto. For example, the embodiments of the present disclosure may be applied to various cases such as a case of the D2D operation between a terminal and a wearable device.

Figure 14:
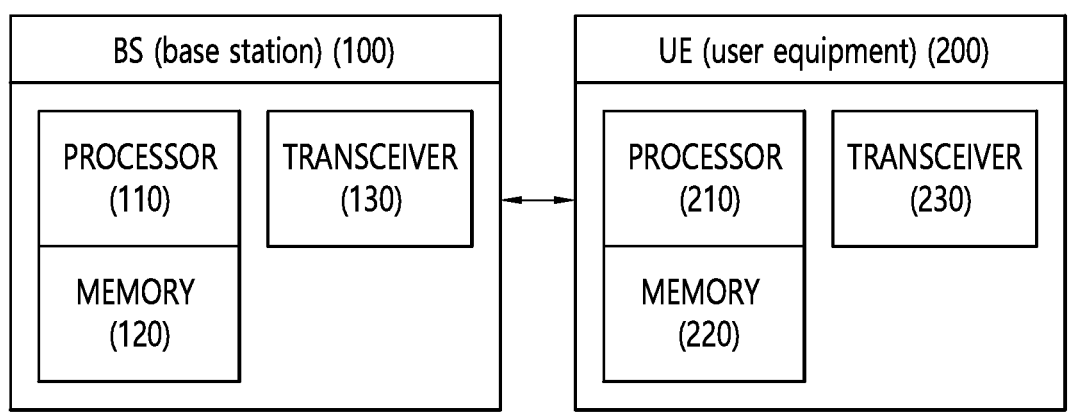
FIG. 14 is a block diagram illustrating a communication device in which an embodiment of the present disclosure is implemented.

FIG. 14 is a block diagram illustrating a communication device in which an embodiment of the present disclosure is implemented.

Referring to FIG. 14, the BS 100 includes a processor 110, a memory 120, and a transceiver 130. The processor 110 implements the proposed functions, processes and/or methods. The memory 120 is connected to the processor 110 and stores various information for driving the processor 110. The transceiver 130 is connected to the processor 110 to transmit and/or receive a radio signal.

The UE 200 includes a processor 210, a memory 220, and an RF unit 230. The processor 210 implements the proposed functions, processes and/or methods. The memory 220 is connected to the processor 210 and stores various information for driving the processor 210. The transceiver 230 is connected to the processor 210 to transmit and/or receive a radio signal. The UE 200 may perform the D2D operation on another terminal according to the method described above.

The processors 110 and 210 may include application-specific integrated circuits (ASICs), other chipsets, logic circuits, data processing devices, and/or converters for converting baseband signals and wireless signals to and from each other. The memories 120 and 220 may include read-only memory (ROM), random access memory (RAM), flash memory, memory card, storage medium, and/or other storage device. The transceivers 130 and 230 may include one or more antennas for transmitting and/or receiving wireless signals. When the embodiment is implemented in software, the above-described technique may be implemented as a module (process, function, etc.) for performing the above-described functions. The module may be stored in the memories 120 and 220 and executed by the processors 110 and 210. The memories 120 and 220 may be present inside or outside the processors 110 and 210 and may be connected to the processors 110 and 210 by various well-known means.

Figure 15:
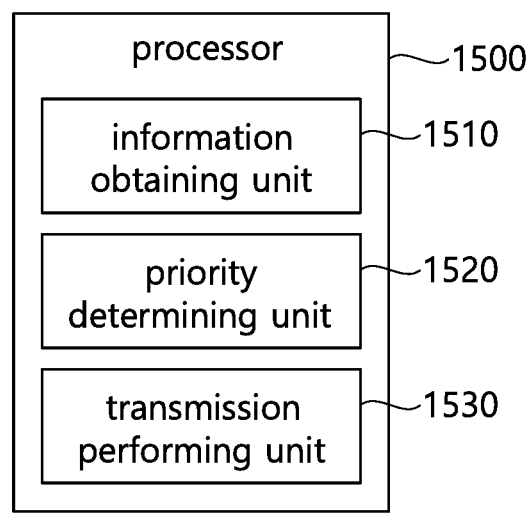
FIG. 15 is a block diagram illustrating an example of a device included in a processor.

FIG. 15 is a block diagram illustrating an example of a device included in a processor.

According to FIG. 15, the processor may include an information obtaining unit 1510, a priority determining unit 1520, and a transmission performing unit 1530 in terms of functionality. Here, the processor may be the processor 210 of FIG. 14.

Herein, the information obtaining unit 1510 may have a function of obtaining the remote UE related information. In addition, the priority determining unit 1520 may have a function of determining a priority between the remote UE related information and a priority between the remote UE related information and the relay UE related information, after the remote UE related information is obtained. Also, the transmission performing unit 1530 performs information transmission based on the priority, but the relay UE may have a function of performing the information transmission by applying different physical channel parameters based on the priority determined by the relay UE.

The description of the device included in the processor described above is merely an example and the processor may further include other functional elements or devices. In addition, specific examples of operations performed by each of the functional devices described above are as described above, and thus, redundant description thereof will be omitted.

What is claimed is:

1. A method for transmitting remote user equipment (UE) related information or relay UE related information in a wireless communication system including a base station (BS), a relay UE, and a remote UE, the method performed by the relay UE and comprising:

receiving, from the remote UE, the remote UE related information;

transmitting, to the BS, the remote UE related information or the relay UE related information based on comparing a priority of the remote UE related information and a priority of the relay UE related information after receiving the remote UE related information, wherein the relay UE performs a transmission by applying different physical channel parameters based on the priority of the remote UE related information and the priority of the relay UE related information, and wherein, based on the remote UE related information being wide area network (WAN) communication related control information or WAN communication related feedback information and the relay UE relate information being WAN communication related data information, the priority of the remote UE related information is higher than the priority of the relay UE related information and the relay UE transmits the WAN communication related control information of the remote UE or the WAN communication related feedback information of the remote UE to the BS.

2. The method of claim 1, wherein the remote UE is a UE having communication capability of a limited size band.

3. A relay user equipment (UE) in a wireless communication system including a base station (BS), the relay UE, and a remote UE, wherein the relay UE comprises:

a transceiver transmitting and receiving a wireless signal; and a processor coupled to the transceiver, wherein the processor is configured to:

control the transceiver to receive, from the remote UE, remote UE related information; and control the transceiver to transmit, to the BS, the remote UE related information or relay UE related information based on comparing a priority of the remote UE related information and a priority of the relay UE related information after receiving the remote UE related information, wherein the relay UE performs a transmission by applying different physical channel parameters based on the priority of the remote UE related information and the priority of the relay UE related information, and wherein, based on the remote UE related information being wide area network (WAN) communication related control information or WAN communication related feedback information and the relay UE relate information being WAN communication related data information, the priority of the remote UE related information is higher than the priority of the relay UE related information and the relay UE transmits the WAN communication related control information of the remote UE or the WAN communication related feedback information of the remote UE to the BS.

* * * * *